(12) United States Patent
Kuhls et al.

(10) Patent No.: US 7,899,558 B2
(45) Date of Patent: Mar. 1, 2011

(54) UPDATING AND/OR EXPANDING THE FUNCTIONALITY OF SEQUENCE CONTROL OF AT LEAST ONE CONTROL UNIT

(75) Inventors: Burkhard Kuhls, Stadtbergen (DE); Harry Knechtel, Berglern (DE); Horst Kiessling, Freising (DE); Thomas Kalverkamp, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 118 days.

(21) Appl. No.: 11/517,252

(22) Filed: Sep. 8, 2006

(65) Prior Publication Data
US 2007/0021844 A1 Jan. 25, 2007

Related U.S. Application Data

(63) Continuation of application No. PCT/EP2004/002402, filed on Mar. 9, 2004.

(51) Int. Cl.
*G05B 11/01* (2006.01)
*H04L 29/06* (2006.01)
(52) U.S. Cl. ........... 700/11; 707/170; 707/600; 713/157; 342/5.21
(58) Field of Classification Search .................. 717/170; 713/157; 707/200; 342/5.21
See application file for complete search history.

(56) References Cited

U.S. PATENT DOCUMENTS

| | | | |
|---|---|---|---|
| 4,868,877 A * | 9/1989 | Fischer ........................ | 713/157 |
| 5,765,656 A * | 6/1998 | Weaver ........................ | 180/65.3 |
| 5,942,949 A * | 8/1999 | Wilson et al. .................. | 331/17 |
| 6,124,826 A * | 9/2000 | Garthwaite et al. ..... | 342/357.09 |
| 6,516,327 B1 * | 2/2003 | Zondervan et al. ........... | 707/200 |
| 6,587,030 B2 * | 7/2003 | Bitzer .......................... | 340/5.21 |
| 6,658,659 B2 * | 12/2003 | Hiller et al. ................... | 717/170 |
| 6,754,717 B1 * | 6/2004 | Day et al. ...................... | 709/248 |
| 6,782,313 B1 | 8/2004 | Frech et al. | |
| 2002/0120856 A1 | 8/2002 | Schmidt et al. | |

(Continued)

FOREIGN PATENT DOCUMENTS

DE 199 21 845 A1 11/2000

(Continued)

OTHER PUBLICATIONS

PCT/IB/338, PCT/IB/373 and PCT/ISA/237 (English Translation)—(Nine (9) Pages).

(Continued)

*Primary Examiner* — Khoi Tran
*Assistant Examiner* — Ian Jen
(74) *Attorney, Agent, or Firm* — Crowell & Moring LLP

(57) ABSTRACT

A method, system, and computer program product for updating and/or expanding the functionality of the sequence control of at least one control unit of a motor vehicle are provided. In accordance with the method, a first data may be read from a first control unit and a second data may be read from a second control unit. A first check in the vehicle may be performed to ascertain whether the version of the sequence control currently running in the second control unit corresponds to a predetermined version of a sequence control or is even more current than the predetermined version. If the outcome of the first check is positive, a more current version in comparison with the version of the sequence control currently running in the first control unit may be saved and/or a version which expands the functionality may be saved in the first control unit.

18 Claims, 3 Drawing Sheets

U.S. PATENT DOCUMENTS

| | | | |
|---|---|---|---|
| 2002/0198638 A1* | 12/2002 | Haag et al. ...................... 701/29 |
| 2003/0131025 A1* | 7/2003 | Zondervan et al. ........... 707/200 |
| 2003/0145127 A1* | 7/2003 | Unice ........................... 709/321 |
| 2003/0159135 A1* | 8/2003 | Hiller et al. ................... 717/166 |
| 2003/0188303 A1* | 10/2003 | Barman et al. ................ 717/170 |
| 2005/0027999 A1* | 2/2005 | Pelly et al. .................... 713/194 |
| 2007/0179906 A1* | 8/2007 | Frankel et al. .................. 705/75 |

FOREIGN PATENT DOCUMENTS

| | | |
|---|---|---|
| DE | 100 08 974 A1 | 9/2001 |
| EP | 1 043 656 A2 | 10/2000 |

OTHER PUBLICATIONS

International Search Report with English translation dated Nov. 2, 2004 (Six (6) Pages).

\* cited by examiner

US 7,899,558 B2

UPDATING AND/OR EXPANDING THE FUNCTIONALITY OF SEQUENCE CONTROL OF AT LEAST ONE CONTROL UNIT

CROSS REFERENCE TO RELATED APPLICATIONS

This application claims priority under 35, U.S.C. §120 to International Patent Application No. PCT/EP2004/002402 filed Mar. 9, 2004, the entire disclosure of which is herein expressly incorporated by reference.

BACKGROUND AND SUMMARY OF THE INVENTION

This invention relates in particular to a method for updating and/or expanding the functionality of the sequence control of at least one control unit of a motor vehicle.

In known methods of updating the sequence controls, i.e., software programs stored in the control units of a motor vehicle, a check is performed prior to "flashing" a first control unit with a new and/or updated sequence control to determine whether it will have any negative effects on the compatibility of all the control units installed in the vehicle and equipped with a certain software. Updating is performed in particular to eliminate errors in the sequence control. For reasons of compatibility, it may be necessary to update not only the sequence control of a single control unit but also that of one or more other control units. To avoid compatibility problems in replacing the software or replacing older control units with newer control units using different hardware, it is customary to output the version numbers of all control units out of the vehicle. Therefore, the actual status of the sequence controls and the actual status of the control units are available outside of the vehicle. Using one or more databases provided outside the vehicle, a determination is made outside of the vehicle to decide whether the actual status of the software and/or hardware requires an update and which software and/or which hardware must be replaced in performing this, and in which order.

The readout of the version numbers of the sequence controls of all control units installed in the vehicle and the readout of the version numbers of the control units to provide this information outside of the vehicle, as performed with the known updating methods, are very time-consuming and therefore expensive.

The present invention improves the known method of updating and/or expanding the functionality of the sequence control of at least one control unit of a motor vehicle.

Other objects advantages, and novel features of the present invention will become apparent from the following detailed description of the invention when considered with the accompanying drawings.

DETAILED DESCRIPTION OF THE DRAWINGS

Figure 1:
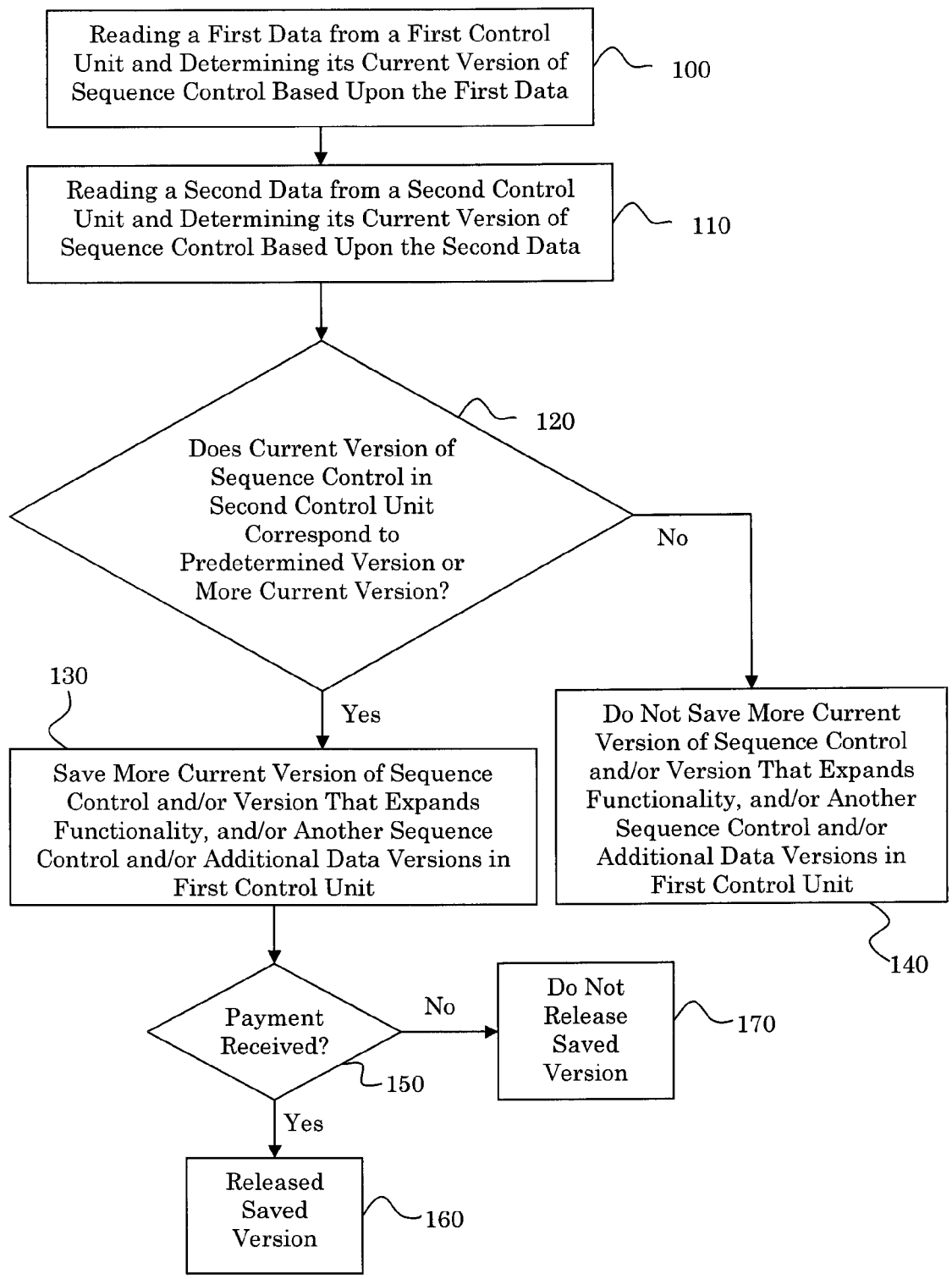
FIG. 1 illustrates an exemplary embodiment of a method in accordance with the present invention.

FIG. 1 illustrates an exemplary embodiment of a method in accordance with the present invention. According to a first aspect of the present invention, the following steps are provided:

Readout of a first data from a first control unit, determining the version of the sequence control currently running in the first control unit on the basis of this data (step 100), Readout of a second data from a second control unit, determining the version of the sequence control currently running in the second control unit on the basis of this data (step 110), A first check in the vehicle to determine whether the version of the sequence control currently running in the second control unit corresponds to a predetermined version of a sequence control or is more current than the predetermined version (step 120), and If the result of the first check is positive, saving a version that expands the functionality and/or a version that is more recent with respect to the version of the sequence control currently running in the first control unit and/or saving an additional sequence control and/or saving additional data versions in the first control unit (step 130). If the result is negative, the saving operation is not performed (step 140). In an exemplary embodiment of the present invention, an additional step may be included in which a determination is made of whether payment for use of the more current version of the sequence control or the version which expands the functionality or the another sequence control or the additional data versions in the first control unit has been received (step 150). If payment has been received, then the saved version described above is released for use in the motor vehicle (step 160). On the other hand, if the payment has not been received, then the saved version is not released (step 170).

According to the first aspect, before altering the sequence control of the first control unit in the vehicle, a check is performed to determine whether the sequence control in the second control unit or in one or more additional control units of the vehicle is compatible with the sequence control provided for execution by the first control unit. Compatibility may be checked by determining the version of the sequence control currently present in the second or additional control units and comparing it with one or more version identification, i.e., version numbers that are considered to be compatible. If the existing version of the sequence control in the second or additional control units is considered to be compatible, then the updated sequence control or an additional sequence control is supplied to the first control unit for execution and/or is saved there for execution. As an alternative or in addition to a sequence control, additional data versions to expand the functionality of the control unit may also be involved. Such additional data versions may include, for example, spatially or chronologically limited map data for a navigation system and/or for the control unit of the navigation system.

Due to the fact that the check for compatibility is performed according to this invention in the vehicle, the time-consuming and therefore expensive exporting of compatibility information out of the vehicle is no longer necessary. Since the compatibility check is performed internally within the vehicle according to this invention, this makes it possible to greatly reduce the opportunity for tampering with the sequence controls, i.e., the software of the control units.

Figure 2:
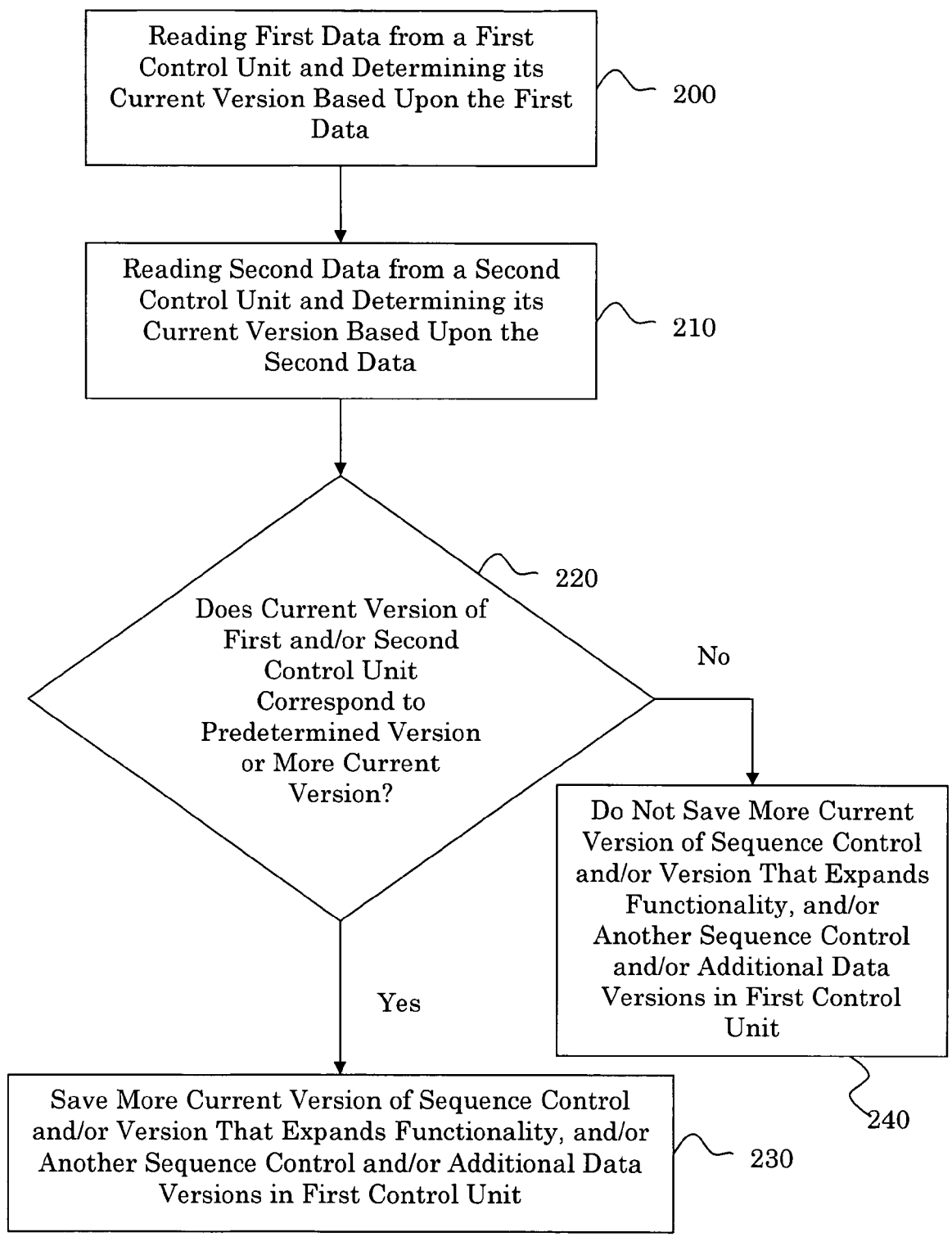
FIG. 2 illustrates another exemplary embodiment of a method in accordance with the present invention.

FIG. 2 illustrates another exemplary embodiment of a method in accordance with the present invention. According to a second aspect, which may be considered as an alternative or an addition to the first aspect of this invention, the following steps are provided:

Readout of a first data from a first control unit, determining the version of the first control unit on the basis of this data (step 200), Readout of a second data from a second control unit, determining the version of the second control unit on the basis of this data (step 210), A second check in the vehicle to determine whether the first and/or second control unit corresponds to a predetermined control unit version or is more current than the predetermined control unit version (step 220), and If the result of the second test is positive, saving a version of the sequence control that is more current than the version currently running in the first control unit and/or saving a first sequence control and/or saving additional data in the first control unit (step 230). If the result is negative, the saving operation is not performed (step 240).

According to the second aspect, before making any alterations in the sequence control of the first control unit in the vehicle, a check is performed to determine whether the version of the second control unit is compatible with the sequence control provided for execution by the first control unit. The compatibility is checked by comparing the current version, i.e., version identification of the second control unit or additional control units with one or more version identifications, i.e., version numbers considered compatible. If the existing version of the second control unit or additional control units is considered compatible, then the updated sequence control or an additional sequence control is supplied to the first control unit for execution and/or is saved there for execution.

These inventive measures likewise permit a compatibility check with the aforementioned advantages of a more rapid update of the sequence controls, i.e., the software statuses of the control units in such a manner that it is better secured against tampering and doing so internally within the vehicle.

In one embodiment of the invention, the actual states of the versions of the sequence controls are determined in the control units of the vehicle and/or the actual states of the versions of the control units of the vehicle are determined in the vehicle, which may be done periodically, and saved in the vehicle.

With this inventive measure, the actual state information required for the update is made available directly. With a periodically recurring determination of the actual states, e.g., after shutdown of the vehicle or during some other "resting phase" of the vehicle, there is thus assurance that the most current actual states are always available.

According to one embodiment of the invention, the ideal states of the versions of the sequence controls for triggering an update or function expansion in the control units and their sequence controls from the outside are transferred to the vehicle and stored there.

In one embodiment of the invention, the target states and their sequence controls have been signed to allow a check for tampering and/or they have been transmitted to the vehicle via a data medium such as a DVD, e.g., carrying additional map information for a navigation system in the vehicle and/or via a wireless interface between the vehicle and the outside world, which may be via a network connection in a vehicle repair shop or via a telecommunications link.

DVDs with navigation data are in a DVD drive in the vehicle which can be accessed by a vehicle data bus. Furthermore, a subscription is usually agreed upon, in which the driver receives DVDs with updated navigation data at certain intervals and replaces the old DVD in the DVD drive with a more recent DVD. According to this invention, the DVD may contain the target states and their sequence controls, which may be digitally signed, for updating the sequence controls of the control units in the vehicle. It is self-evident that instead of a DVD some other mobile data medium may also be used if it is more expedient.

Through a signature check which is performed in the vehicle and can therefore be designed to be largely tamper-proof, e.g., as part of a public key process such as that described below, it is possible to ensure that only authorized sequence control or control units, in particular those authorized by the vehicle manufacturer, can be executed and/or used in the vehicle. The check of the signature may be performed by using a public key which has been stored in the vehicle in a form in which it is protected from alteration and/or tampering.

In one embodiment of the invention, the target states of the versions of the sequence controls are compared in the vehicle with the actual states of the versions of the sequence controls, and in the event a deviation from an update instance provided in the vehicle is found, a database of measures imported into the vehicle from the outside and stored in the vehicle is accessed, indicating the storage measures required for updating and the order in which they are to be performed.

Figure 3:
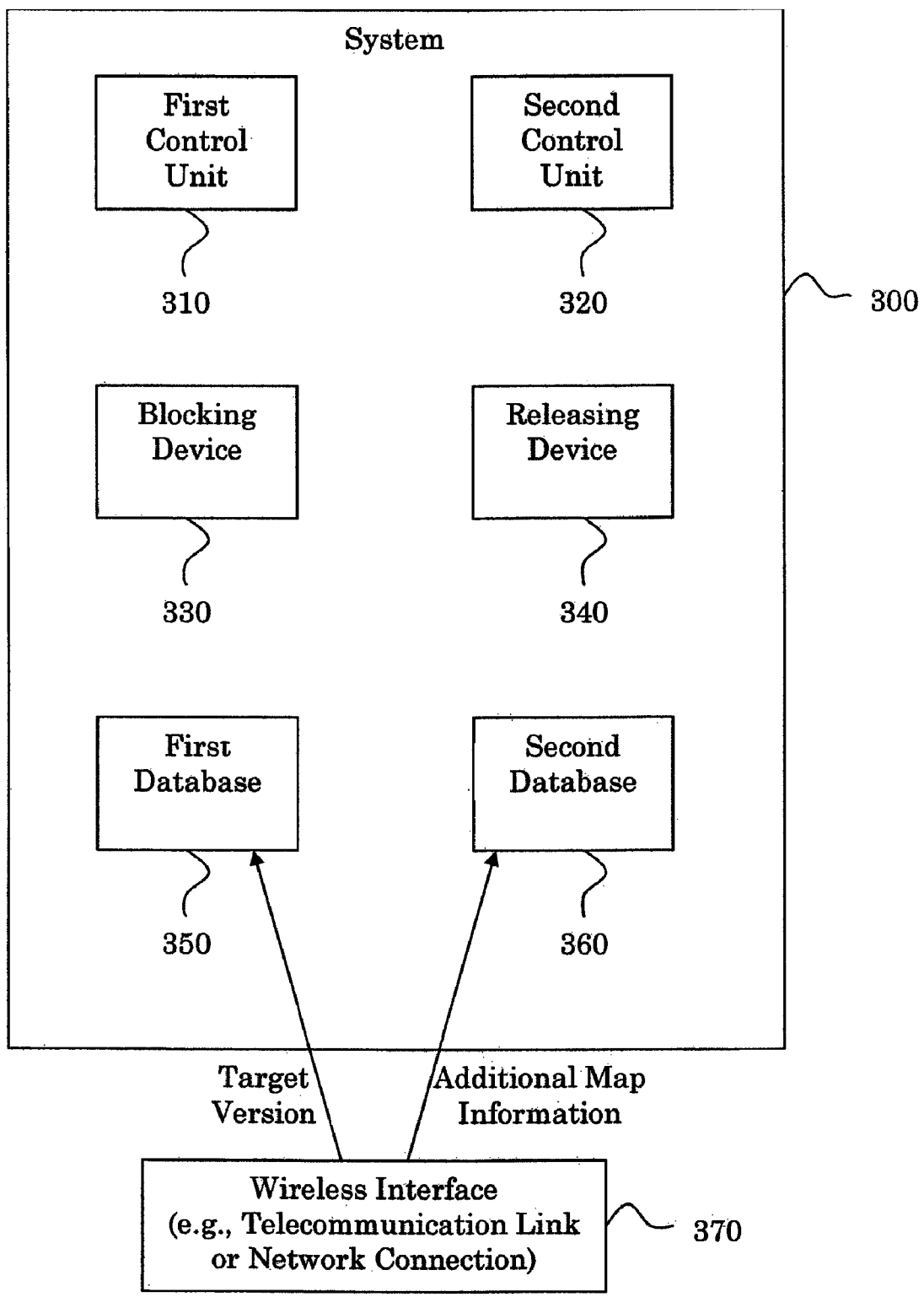
FIG. 3 illustrates an exemplary embodiment of a system in accordance with the present invention.

FIG. 3 illustrates an exemplary embodiment of a system in accordance with the present invention. The system 300 illustrated in FIG. 3 may include, but is not limited to, a First Control Unit 310, a Second Control Unit 320, a Blocking Device 330, a Releasing Device 340, a First Database 350, a Second Database 360, and a Wireless Interface 370 which may be a network connection, telecommunication link, or the like. Exemplary first and second control units are described above and further described below. Exemplary embodiments of the blocking device, releasing device, and first and second databases are described below.

One embodiment of the invention is designed so that the first check performed in the vehicle is performed using a first database provided in the vehicle, indicating which version of the sequence control, i.e., software, must be present in the second control unit to be compatible with the version or expansion of the sequence and/or the additional data versions provided for saving in the first control unit.

In one embodiment of the invention, the second check in the vehicle may be performed using a second database provided in the vehicle indicating which control unit version the second control unit must have to be compatible with the version or expansion of the sequence control and/or the additional data provided for saving in the first control unit.

It is self-evident that the first and second databases may be a single database having appropriate entries.

In one embodiment of the invention, a blocking device is provided in the vehicle to prevent the more current version of the sequence control and/or the expansion of the sequence control and/or the additional data versions from being saved in the first control unit if the first and/or second checks have turned out negative.

Due to the blocking device provided in the vehicle according to this invention, this ensures that incompatible software will not be executed and/or used by the control units in the vehicle. This may be a blocking device based on software which is implemented in the vehicle in a form in which it is largely secure from tampering.

In another embodiment of the invention, a releasing device is provided in the vehicle. The more current version of the sequence control and/or the expansion of the sequence and/or the additional data may be executed by the first control unit only if it has been released for execution by the releasing device, for example, by using one or more release codes.

The releasing device according to this invention makes it possible, for example, to introduce additional software versions that require payment, in particular signed software, in a non-released form into the vehicle before the software version has been ordered and/or paid for. If the driver orders one or more of these software versions, the software versions already in the vehicle may be made available by releasing them for use immediately following the ordering and/or payment process. This may involve the use of a software-based releasing device that is implemented in the vehicle in a largely tamper-proof manner.

In one embodiment of the present invention, the entries into the first and/or second databases are provided with a digital signature. They are checked for integrity as part of a first signature check performed in the vehicle prior to the use of these entries, in particular for the first and/or second check.

In another embodiment of the invention, the more current version of the sequence control and/or the expansion of the sequence control and/or the additional data may be executed by the first control unit only if the signature check, which has resulted in digitally signed entries into the first and/or second databases, the entries and/or first and/or second databases are and/or have been corrupted.

Due to these measures taking place in the vehicle, it is possible to ensure that the database(s) have not been manipulated and that only authorized software versions have been executed or used in the vehicle. The databases may originate from the manufacturer of the vehicle.

In another embodiment of this invention, the more current version of the sequence control and/or the expansion to the sequence control and/or the additional data versions are each signed digitally and checked for their authenticity prior to execution by the first control unit as part of a second signature check which is provided in the vehicle.

In one embodiment of this invention, the more current version of the sequence control and/or the expansion of the sequence control and/or the additional data versions can be executed by the first control unit only if the second signature check has revealed that it is/they are authentic.

As a result of these measures taking place in the vehicle, it is possible to ensure that the software versions have not been manipulated and only authorized software versions are executed or used in the vehicle. The software versions may originate from the manufacturer of the vehicle.

In one embodiment of the invention, the first and/or second signature check performed in the vehicle is performed within the context of a public key method using a public key which is complementary to the secret key and the public key is stored in the vehicle in at least one location, and may be stored in at least two locations in the vehicle where it can be accessed but is protected from tampering.

In another embodiment of the invention, a key test is performed in the vehicle in which the presence and identity of the public key stored in at least two different locations is checked, and the public key is used as part of the public key method only if the key test has turned out positive.

This measure in the vehicle makes it possible to prevent tampering with the public key and to ensure on the whole that only authorized software versions, in particular software versions authorized by the automobile manufacturer, will be executed and/or used by the control units in the motor vehicle.

The inventive methods also make it possible to provide an advantageous system and an advantageous computer program product for updating and/or expanding the functionality of the sequence control of at least one control unit of a motor vehicle.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for upgrading or expanding functionality of a sequence control of at least one control unit of a motor vehicle, comprising the acts of:

reading a first data from a first control unit, and determining a version of the sequence control currently running in the first control unit based upon the first data, reading a second data from a second control unit, and determining a version of the sequence control currently running in the second control unit based upon the second data, determining, in a first check, whether the version of the sequence control currently running in the second control unit corresponds to a predetermined version of the sequence control or is more current than the predetermined version, if the result of the first check is positive, saving a more current version of the sequence control with respect to the version currently running in the first control unit or a version which expands the functionality, or saving an additional sequence control or saving additional data versions in the first control unit, and releasing the more current version of the sequence control, the version which expands the functionality, the additional sequence control, or the additional data versions for use in the motor vehicle only after receiving a payment for use thereof, wherein the versions of the sequence controls in the control units of the motor vehicle and a versions of the control units of the motor vehicle in the vehicle are determined periodically and stored in the vehicle.

2. The method claimed in claim 1, further comprising the acts of:

reading the first data from the first control unit, and determining a version of the first control unit based upon the first data, reading the second data from the second control unit, and determining a version of the second control unit based upon the second data, determining, in a second check, whether the first or second control unit corresponds to a predetermined control unit version or is even more current than the predetermined control unit version, and if the result of the second check is positive, saving a more current version of the sequence control in comparison with the version of the sequence control running in the first control unit or the version expanding the functionality, or saving another sequence control or saving additional data versions in the first control unit.

3. The method as claimed in claim 1, wherein target versions of the sequence controls in the control units and their sequence controls are transmitted into the motor vehicle from the outside and are stored there.

4. The method as claimed in claim 1, wherein target versions of the sequence controls are signed for the purpose of checking for tampering and are transmitted to the vehicle via a data medium, which has additional map information for a navigation system provided in the motor vehicle or via a wireless interface between the motor vehicle and the outside world, via a network connection in the form of a vehicle repair shop, or via a telecommunications link.

5. The method as claimed in claim 1, wherein target versions of the sequence controls are compared with the versions of the sequence controls in the vehicle, and when there is a deviation from an updating instance provided in the vehicle, a database of measures imported into the vehicle from the outside and stored there is accessed, said database specifying the measures that must be taken and the order in which they must be taken to save the data for the update.

6. The method as claimed in claim 1, wherein the first check performed in the motor vehicle is performed by using a first database provided in the motor vehicle, indicating which version of the sequence control must be provided in the second control unit to be compatible with the version or expansion of the sequence control or the additional data versions provided for storage in the first control unit.

7. The method as claimed in claim 1, wherein the second check is performed in the motor vehicle using a second database provided in the motor vehicle, indicating which control unit version the second control unit must have to be compatible with the version or expansion of the sequence control or the additional data versions provided for storage in the first control unit.

8. The method as claimed in claim 1, wherein a blocking device is provided in the motor vehicle, preventing storage of the more current version of the sequence control or the expansion of the sequence control or the additional data versions in the first control unit if the first or second check has turned out negative.

9. The method as claimed in claim 1, wherein a releasing device is provided in the motor vehicle and the more current version of the sequence control or the expansion of the sequence control or the additional data versions can be executed by the first control unit only upon having been released by the releasing device, using one or more release codes.

10. The method as claimed in claim 1, wherein entries in first or second databases are provided with a digital signature which is checked for authenticity before being used for the first or second check as part of a first signature test provided in the motor vehicle.

11. The method as claimed in claim 10, wherein the more current version of the sequence control or the expansion of the sequence control or the additional data versions can be executed by the first control unit only if the first signature test of the digitally signed entries of the first or second databases has shown that the entries in the first or second databases are authentic.

12. The method as claimed in claim 10, wherein the more current version of the sequence control or the expansion of the sequence control or the additional data versions are each signed digitally and checked for their authenticity prior to their execution by the first control unit as part of a second signature test provided in the motor vehicle.

13. The method as claimed in claim 12, wherein the more current version of the sequence control or the expansion of the sequence control or the additional data versions can be executed by the first control unit only when the second signature test has shown that they are authentic.

14. The method as claimed in claim 12, wherein the first or second signature test performed in the vehicle is performed as part of a public key method using a public key which is complementary to a secret key and the public key is stored in at least two different locations in the motor vehicle so that it can be read out but is protected from tampering.

15. The method as claimed in claim 14, wherein a key test is performed in the motor vehicle, checking for the presence of, and identifying, the public key stored in the at least two different locations, wherein the public key can be used as part of the public key proceedings only if the key test has turned out positive.

16. A system for updating or expanding functionality of sequence control of at least one control unit of a motor vehicle, the system comprising:

a first control unit configured to operate with a first sequence control version, and a second control unit configured to operate with a second sequence control version, wherein a first check determines whether the version of the sequence control currently running in the second control unit corresponds to a predetermined version of the sequence control or is more current than the predetermined version, and if the result of the first check is positive, a more current version of the sequence control with respect to the version currently running in the first control unit or a version which expands the functionality is saved, or another sequence control or additional data versions are saved, in the first control unit.

17. A computer program product for updating or expanding functionality of a sequence control of at least one control unit of a motor vehicle, the computer program product stored on a computer readable medium and adapted to perform operations comprising:

reading a first data from a first control unit, and determining a version of the sequence control currently running in the first control unit based upon the first data, reading a second data from a second control unit, and determining a version of the sequence control currently running in the second control unit based upon the second data, determining, in a first check, whether the version of the sequence control currently running in the second control unit corresponds to a predetermined version of the sequence control or is more current than the predetermined version, if the result of the first check is positive, saving a more current version of the sequence control with respect to the version currently running in the first control unit or a version which expands the functionality, or saving an additional sequence control or saving additional data versions in the first control unit, and releasing the more current version of the sequence control, the version which expands the functionality, the additional sequence control, or the additional data versions for use in the motor vehicle only after receiving a payment for use thereof, wherein the versions of the sequence controls in the control units of the motor vehicle and a versions of the control units of the motor vehicle in the vehicle are determined periodically and stored in the vehicle.

18. The computer program product of claim 17, further comprising:

outputting the first data from the first control unit, and determining a version of the first control unit based upon the first data, outputting the second data from the second control unit, and determining a version of the second control unit based upon the second data, determining, in a second check, whether the first or second control unit corresponds to a predetermined control unit version or is even more current than the predetermined control unit version, and if the result of the second check is positive, saving a more current version of the sequence control in comparison with the version of the sequence control running in the first control unit or the version expanding the functionality, or saving another sequence control or saving additional data versions in the first control unit.

* * * * *